United States Patent
Kwon et al.

(10) Patent No.: US 9,521,629 B2
(45) Date of Patent: Dec. 13, 2016

(54) TRANSMIT POWER CONTROL METHOD OF TERMINAL IN DIRECT COMMUNICATION BETWEEN TERMINALS, AND TERMINAL SUPPORTING THE SAME

(71) Applicant: Electronics and Telecommunications Research Institute, Daejeon (KR)

(72) Inventors: Taesoo Kwon, Daejeon (KR); Ji Hyung Kim, Daejeon (KR); Moon-Sik Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 227 days.

(21) Appl. No.: 14/557,143

(22) Filed: Dec. 1, 2014

(65) Prior Publication Data
US 2015/0156728 A1 Jun. 4, 2015

(30) Foreign Application Priority Data

Dec. 2, 2013 (KR) .................. 10-2013-0148689
Oct. 29, 2014 (KR) .................. 10-2014-0148684

(51) Int. Cl.
| H04Q 7/00 | (2006.01) |
| H04W 52/24 | (2009.01) |
| H04W 4/00 | (2009.01) |
| H04W 52/16 | (2009.01) |
| H04W 52/46 | (2009.01) |

(52) U.S. Cl.
CPC .......... *H04W 52/242* (2013.01); *H04W 4/005* (2013.01); *H04W 52/16* (2013.01); *H04W 52/46* (2013.01)

(58) Field of Classification Search
None
See application file for complete search history.

(56) References Cited

U.S. PATENT DOCUMENTS

| 8,369,800 | B2 | 2/2013 | Li et al. | |
| 8,526,410 | B2 | 9/2013 | Li et al. | |
| 2010/0110999 | A1* | 5/2010 | Li | H04W 52/242 370/329 |
| 2011/0223953 | A1* | 9/2011 | Lee | H04W 76/023 455/509 |
| 2014/0004867 | A1 | 1/2014 | Noh et al. | |
| 2015/0319765 | A1* | 11/2015 | Zhu | H04W 28/16 370/329 |
| 2016/0142986 | A1* | 5/2016 | Seo | H04W 52/367 455/422.1 |

* cited by examiner

*Primary Examiner* — Duc C Ho
(74) *Attorney, Agent, or Firm* — William Park & Associates Ltd.

(57) ABSTRACT

A transmit power control method of a terminal in direct communication between terminals is disclosed. The terminal measures a path loss gain of a base station, and compares the measured path loss gain with a predetermined threshold value. The terminal sets a power value for direct communication in the case in which the measured path loss gain is less than or equal to the predetermined threshold value, and performs the direct communication at the set power value.

14 Claims, 6 Drawing Sheets

TRANSMIT POWER CONTROL METHOD OF TERMINAL IN DIRECT COMMUNICATION BETWEEN TERMINALS, AND TERMINAL SUPPORTING THE SAME

CROSS-REFERENCE TO RELATED APPLICATION

This application claims priority to and the benefit of Korean Patent Application Nos. 10-2013-0148689 and 10-2014-0148684 filed in the Korean Intellectual Property Office on Dec. 2, 2013 and Oct. 29, 2014, the entire contents of which are incorporated herein by reference.

BACKGROUND OF THE INVENTION (a) Field of the Invention

The present invention relates to a transmit power control method of a terminal in direct communication between terminals, and a terminal supporting the same.

(b) Description of the Related Art

Recently, in order to implement social networking between neighboring users, public safety, and the like, device to device (D2D) communication in which communication is directly performed between terminals without going through a base station has been discussed in the 3GPP Standards Association, and the like.

In typical cellular communication, the terminal controls interference between surrounding cells by adjusting transmit power. Particularly, transmit power of a reverse (uplink) terminal is set as expressed in the following Equation 1 depending on a distance from the base station, a modulation and coding scheme (MCS) level, and the like.

$$P^{UE} = \min\left[P_{MAX}, \underbrace{P_0 - \alpha \cdot G}_{\text{OL operating point}} + \underbrace{\Delta_{TF} + f(\Delta_{TPC})}_{\text{dynamic offset}} + \underbrace{10 \cdot \log_{10} M}_{\text{BW factor}}\right] \quad \text{[Equation 1]}$$

In Equation 1, G represents path loss between the terminal and the base station, and an open loop (OL) operating point represents compensation for the path loss. A dynamic offset represents adjustment of the transmit power taking account of the modulation and coding scheme (MCS) and transmit power control (TPC) of a network which are used. In addition, a bandwidth (BW) factor is a parameter taking account of the number of assigned resource blocks (RBs).

The OL operating point is the most important factor when the terminal sets the transmit power based on Equation 1. In the OL operating point, $P_0$ is a base value which is used to control a signal-to-noise ratio (SNR) target value, and may be set as expressed in the following Equation 2.

$$P_0 = \alpha \cdot (\gamma tgt + P_{IN}) + (1-\alpha) \cdot (P_{MAX} - 10 \cdot \log_{10} M) \quad \text{[Equation 2]}$$

In Equation 2, $\alpha$ represents a path loss compensation parameter and $P_{IN}$ represents expected values for noise and interference amount. $\gamma^{tgt}$ refers to a target signal-to-noise ratio (SNR). $\alpha=0$ refers to a fixed $P_0$ and $\alpha=1$ refers to complete compensation for the path loss. In general, $\alpha$ is set to a range of $0<\alpha<1$, and as a result, a reverse transmit power method of a terminal in a cellular communication system is called fractional power control (FPC).

The D2D communication does not use a different frequency than that of the cellular communication system, but reuses the same frequency. As such, since the frequency of the cellular communication system is reused in the D2D communication, service capacity that a user actually experiences may be improved. In this case, the transmit power of the terminal which has performed the D2D communication has an important effect on the entire system performance as well as performance of a D2D link itself due to an effect of interference between D2D links and mutual interference with a cellular link. Therefore, there is also a need to control transmit power of the terminal performing the D2D communication.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a transmit power control method in direct communication between terminals.

An exemplary embodiment of the present invention provides a method of setting transmit power by a first terminal performing direct communication with a counterpart terminal. The method may include: measuring a first channel gain which is a path loss gain between a base station to which the first terminal belongs and the first terminal; comparing the first channel gain with a predetermined threshold value; setting a first power value for the direct communication in the case in which the first channel gain is less than or equal to the threshold value; and performing the direct communication at the first power value.

The method may further include not performing the direct communication in the case in which the first channel gain is larger than the threshold value.

The setting of the first power value may include setting the first power value by considering a second channel gain which is a path loss gain between the counterpart terminal and the first terminal, and the first channel gain.

The method may further include receiving first and second power control factors from the base station, wherein the first power value may be set by a value obtained by multiplying the first channel gain by the first power control factor and a value obtained by multiplying the second channel gain by the second power control factor.

The base station may set the first power control factor using a reverse cellular signal which is received from a terminal performing cellular communication with the base station, and set the second power control factor using reference signals which are received from the first terminal and the counterpart terminal.

The measuring of the first channel gain may include receiving a reference signal from the base station, measuring the reference signal, and calculating the first channel gain.

The first terminal may calculate the second channel gain using a reference signal which is received from the counterpart terminal.

A resource for the direct communication may be overlapped with a resource which is used for cellular communication performed by the base station.

Another embodiment of the present invention provides a terminal. The terminal may include: a radio frequency (RF) module receiving a reference signal from a base station; and a processor measuring a first channel gain which is a path loss gain with the base station using the reference signal and controlling direct communication with a counterpart terminal, wherein the processor may include a power setting module comparing the first channel gain with a predetermined threshold value and setting a first power value for the direct communication in the case in which the first channel gain is less than or equal to the threshold value.

The power setting module may set a power value so as to not perform the direct communication in the case in which the first channel gain is larger than the threshold value.

The power setting module may set the first power value by considering a second channel gain which is a path loss gain between the counterpart terminal and the terminal, and the first channel gain.

The RF module may receive first and second power control factors from the base station, and the power setting module may set the first power value so as to correspond to a value obtained by multiplying the first channel gain by the first power control factor and a value obtained by multiplying the second channel gain by the second power control factor.

The base station may set the first power control factor using a reverse cellular signal which is received from a terminal performing cellular communication with the base station, and set the second power control factor using reference signals which are received from the terminal and the counterpart terminal.

A resource for the direct communication may be overlapped with a resource which is used for cellular communication performed by the base station.

According to an embodiment of the present invention, it is possible to prevent communication quality degradation by considering the cellular link as well as the direct communication link when the terminal sets the transmit power for the direct communication.

DETAILED DESCRIPTION OF THE EMBODIMENTS

Figure 1A:
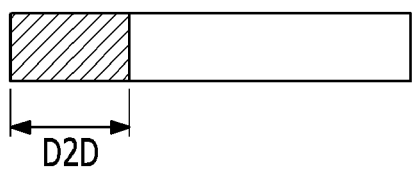
FIGS. 1A-1B show resources of direct communication between terminals (D2D) according to an exemplary embodiment of the present invention.
Figure 1A:
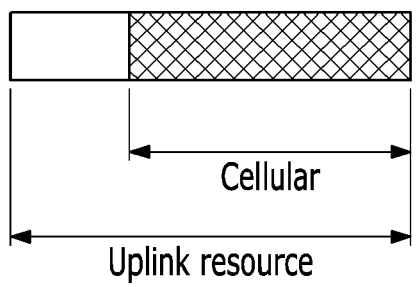

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may be referred to as a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include all or some of the functions of the terminal, the MT, the AMS, the HR-MS, the SS, the PSS, the AT, the UE, or the like.

In addition, a base station (BS) may be referred to as an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as the base station, a high reliability relay station (HR-RS) serving as the base station, or the like, and may include all or some of the functions of the ABS, the nodeB, the eNodeB, the AP, the RAS, the BTS, the MMR-BS, the RS, the HR-RS, or the like.

A transmit power control method of a terminal in direct communication between terminals according to an exemplary embodiment of the present invention will be described in detail with reference to the accompanying drawings. More specifically, in the case in which resources for direct communication between terminals are resources of a cellular communication system, a method for setting an open loop (OL) operating point when the terminal sets transmit power will be described.

Figure 1B:
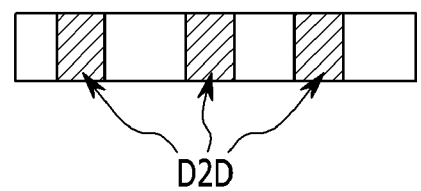
Figure 1B:
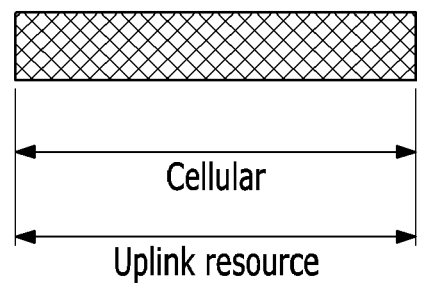

FIGS. 1A-1B show resources of direct communication between terminals (D2D) according to an exemplary embodiment of the present invention.

FIG. 1A shows an overlay scheme in which a D2D resource and a cellular resource are separated from each other in the entire resource (frequency or time). FIG. 1B shows an underlay scheme in which the D2D resource and the cellular resource are overlapped with each other in the entire resource. Although FIG. 1A-1B show a case in which the entire resource is an uplink resource of cellular communication, the entire resource may be a downlink resource.

The overlay scheme as shown in FIG. 1A has no mutual interference and is easily implemented because the cellular link and the D2D link use separate resources. However, the overlay scheme has a drawback that spatial reuse efficiency of radio resources is decreased. Meanwhile, in the underlay scheme, since the cellular link and the D2D link simultaneously use the radio resource, efficiency of the resource is increased, but interference may occur between the cellular link and the D2D link.

A hybrid scheme in which the overlay scheme and the underlay scheme are used together may be used. The entire resource may be divided into a dedicated resource for the cellular link, a dedicated resource for the D2D link, and a common resource for the D2D and cellular links, the dedicated resources may be operated in the overlay scheme, and the common resource may be operated in the underlay scheme. Quality of cellular service and D2D service may be improved by using the dedicated resource, and efficiency of the resource may be increased by using the common resource.

A power control method according to an exemplary embodiment of the present invention which is described below will be described by assuming use of the underlay scheme in which the radio resource is simultaneously used between the cellular link and the D2D link. That is, a power control method for decreasing interference in the underlay scheme will be described.

Figure 2:
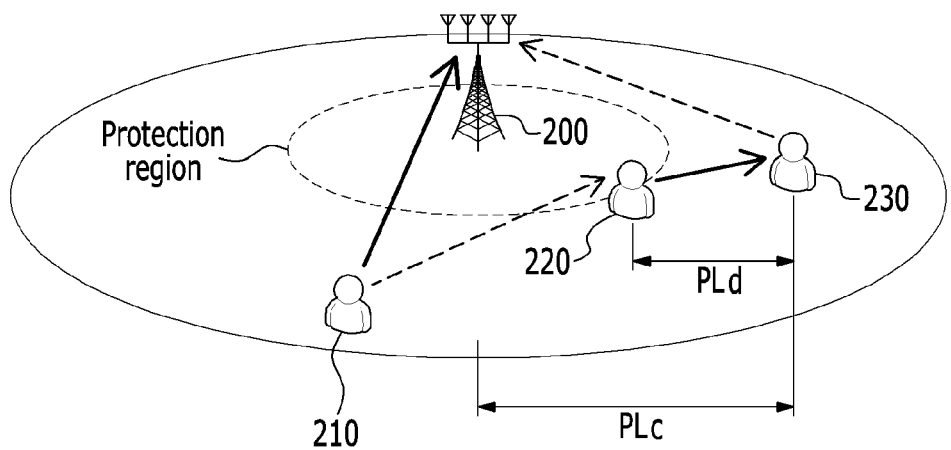
FIG. 2 is a drawing conceptually showing a power control method according to an exemplary embodiment of the present invention.

FIG. 2 is a drawing conceptually showing a power control method according to an exemplary embodiment of the present invention.

As shown in FIG. 2, a communication system according to an exemplary embodiment of the present invention includes a base station 200 and a plurality of terminals 210, 220, and 230.

The base station 200 may perform cellular communication with the plurality of terminals 210, 220, and 230, and may include a plurality of antennas.

The terminal 210 is a terminal performing cellular communication with the base station 100. Uplink data which is transmitted to the base station 100 by the terminal 210 may act as interference for the terminal 220. In FIG. 2, solid lines indicate a transmit signal and dotted lines indicate an interference signal.

The terminals 220 and 230 are terminals performing direct communication, and the terminal 220 is shown as a terminal transmitting data for the direct communication with the terminal 230. Direct communication data which is transmitted to the terminal 230 by the terminal 220 may act as interference for the base station 200.

The terminal 220 performing the direct communication according to the exemplary embodiment of the present invention measures a path loss gain (PLc) using forward (downlink) receive power which is transmitted from the base station 200. Here, in the case in which the measured path loss gain (PLc) is less than or equal to a predetermined threshold value, the terminal 220 transmits the direct communication data at predetermined transmit power, and in the case in which the measured path loss gain (PLc) is larger than the predetermined threshold value, the terminal 220 does not transmit the direct communication data. In FIG. 2, a protection region indicates the threshold value for the path loss gain (PLc) as a region. That is, only in the case in which the terminal 220 according to the exemplary embodiment of the present invention is located out of the protection region may the terminal 220 transmit the direct communication data. According to a method of measuring the path loss gain (PLc) by the terminal 220, the path loss gain (PLc) is measured by the forward receive power which is transmitted from the base station 200. Since this is known to those skilled in the art, a detailed description thereof will be omitted. Meanwhile, in FIG. 2, a path loss gain between the terminals 220 and 230 performing the direct communication is indicated as PLd, and the terminal 220 may be measured by a reference signal or the like which is transmitted from the terminal 230.

According to the exemplary embodiment of the present invention as described above, quality of a reverse (uplink) backhaul link may be maintained at a predetermined level or more by setting the protection regions for cellular links in the respective cells. In addition, in the case in which a specific condition is satisfied, the radio resource may be actively used.

Meanwhile, in the case in which the path loss gain (PLc) is less than or equal to the predetermined threshold value as shown in FIG. 2, the direct communication data is not transmitted at the predetermined transmit power, and the transmit power may be changed by considering a predetermined factor. For example, a terminal which is far away from the protection region may transmit the direct communication data with higher transmit power than that of the terminal which is close to the protection region. In addition, in the case in which the path loss gain (PLc) is less than or equal to the predetermined threshold value, the terminal performing the direct communication may set the transmit power by considering the cellular link and the D2D link in order to improve performance between the D2D links as well as interference for the cellular link. The above-mentioned exemplary embodiment will be described with reference to FIGS. 3 and 4.

Figure 3:
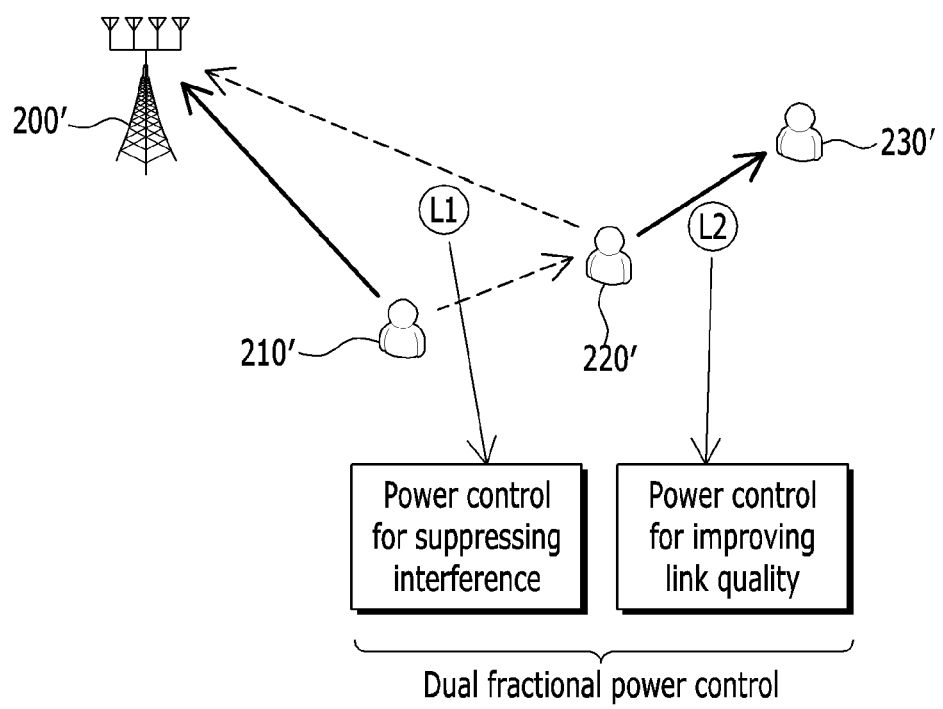
FIG. 3 is a drawing conceptually showing a power control method according to another exemplary embodiment of the present invention.

FIG. 3 is a drawing conceptually showing a power control method according to another exemplary embodiment of the present invention.

As shown in FIG. 3, a terminal 220' according to another exemplary embodiment of the present invention simultaneously considers power control L1 for suppressing interference for the cellular link and power control L2 for improving D2D link quality. That is, the terminal 220' sets power by considering a path loss gain (PLd) between terminals 220' and 230' as well as a path loss gain (PLc) from a base station. The power control method according to the current exemplary embodiment of the present invention as described above is defined as dual fractional power control (DFPC).

The power control method according to the current exemplary embodiment of the present invention is expressed by the following Equation 3.

$$Pd = \begin{cases} 0, & \text{if } PLc > \gamma \\ \max(\min(P_0 + \varepsilon_c^{(d)}PLc + \varepsilon_d^{(d)}PLd, P_{\max}), P_{\min})\text{dB}, & \text{if } PLc \leq \gamma \end{cases} \quad \text{[Equation 3]}$$

In Equation 3, $\gamma$ is a value corresponding to the protection region which is described in FIG. 2, and may be received from the base station 200. In the case in which the path loss gain (PLc) from the base station 200' is larger than a predetermined threshold value ($\gamma$) (i.e., PLc>$\gamma$), the terminal 220' does not perform the direct communication by setting power for the direct communication to zero (0). In addition, in the case in which the path loss gain (PLc) from the base station is less than or equal to the predetermined threshold value ($\gamma$) (i.e., PLc≤$\gamma$), the terminal 220' sets the power for the direct communication by considering the path loss gain (PLd) between terminals as well as the path loss gain (PLc) from the base station. $P_0$ is power which is basically set to the value in Equation 2, PLc is the path loss gain from the base station, and PLd is the path loss gain due to the direct communication between the terminals 220' and 230'. Pmax is a maximum power value which may be transmitted by the terminal 220' performing the direct communication, and Pmin is a minimum power value which may be transmitted by the terminal 220' performing the direct communication. Pmax and Pmin are values which are preset when setting a direct communication environment.

Meanwhile, in Equation 3, $\varepsilon_c^{(d)}$ represents a power control factor for suppressing interference for the cellular link, and $\varepsilon_d^{(d)}$ represents a power control factor for improving D2D link quality. Both $\varepsilon_c^{(d)}$ and $\varepsilon_d^{(d)}$ may have a value greater than or equal to 0 and less than or equal to 1. The terminal 220' may receive the two power control factors $\varepsilon_c^{(d)}$ and $\varepsilon_d^{(d)}$ from the base station 200' which is a serving base station, or a third node That is, the base station 200' or the third node may set the two power control factors $\varepsilon_c^{(d)}$ and $\varepsilon_d^{(d)}$ by directly measuring a reverse (uplink) cellular signal and an amount of interference which is received from the terminals 220' and 230' performing the direct communication. In addition, the terminals 220' and 230' performing the direct communication with the terminal 210' performing the reverse cellular communication may transmit information associated with themselves to the base station 200' in a message form, and the base station 200' may set the two power control factors $\epsilon_c^{(d)}$ and $\epsilon_d^{(d)}$ using the above-mentioned information. For example, direct communication capacity between the terminals is increased by setting $\epsilon_c^{(d)}$ to be larger in order to actively use a cellular resource in the direct communication between the terminals, while the value of $\epsilon_c^{(d)}$ is set to be smaller in order to guarantee cellular link quality. In addition, for $\epsilon_d^{(d)}$, in the case in which a balance of link qualities is highlighted by considering an interference environment between the direct communication links between the terminals, the value of $\epsilon_d^{(d)}$ may be set to be larger, and otherwise, the value of $\epsilon_d^{(d)}$ may be set to be smaller. A relationship between $\epsilon_c^{(d)}$ and $\epsilon_d^{(d)}$ may be set depending on a guarantee degree of the cellular link quality, the number of direct communication links between the terminals, and a target quality degree.

Figure 4:
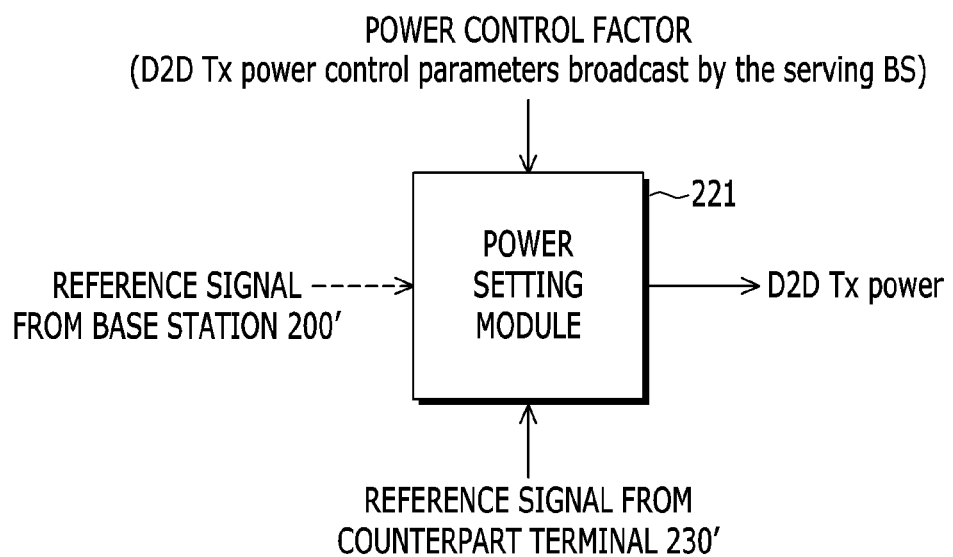
FIG. 4 is a drawing showing a case in which a terminal 220' according to another exemplary embodiment of the present invention sets power for the direct communication.

FIG. 4 is a drawing showing a case in which the terminal 220' according to the current exemplary embodiment of the present invention sets power for the direct communication. That is, FIG. 4 is a drawing showing a method in which a power setting module 221 of the terminal 220' sets power by using the DFPC scheme.

As shown in FIG. 4, the power setting module 221 may calculate the path loss gain (PLc) by measuring a reference signal which is transmitted from the base station 200'. In addition, the power setting module 221 calculates the path loss gain (PLd) by measuring a reference signal which is received from a counterpart terminal 230' performing the direct communication. Meanwhile, the power setting module 221 receives the power control factor which is transmitted from the base station 200' or the third node. In addition, the power setting module 221 derives transmit power for direct communication (Pd, D2D, Tx Power) by using Equation 3. An actual transmit power value of the terminal 220' is finally set by considering the used MCS level, the number of used resources, and an adaptive transmit power value according to a channel condition together with the set transmit power value as expressed in Equation 3.

Figure 5:
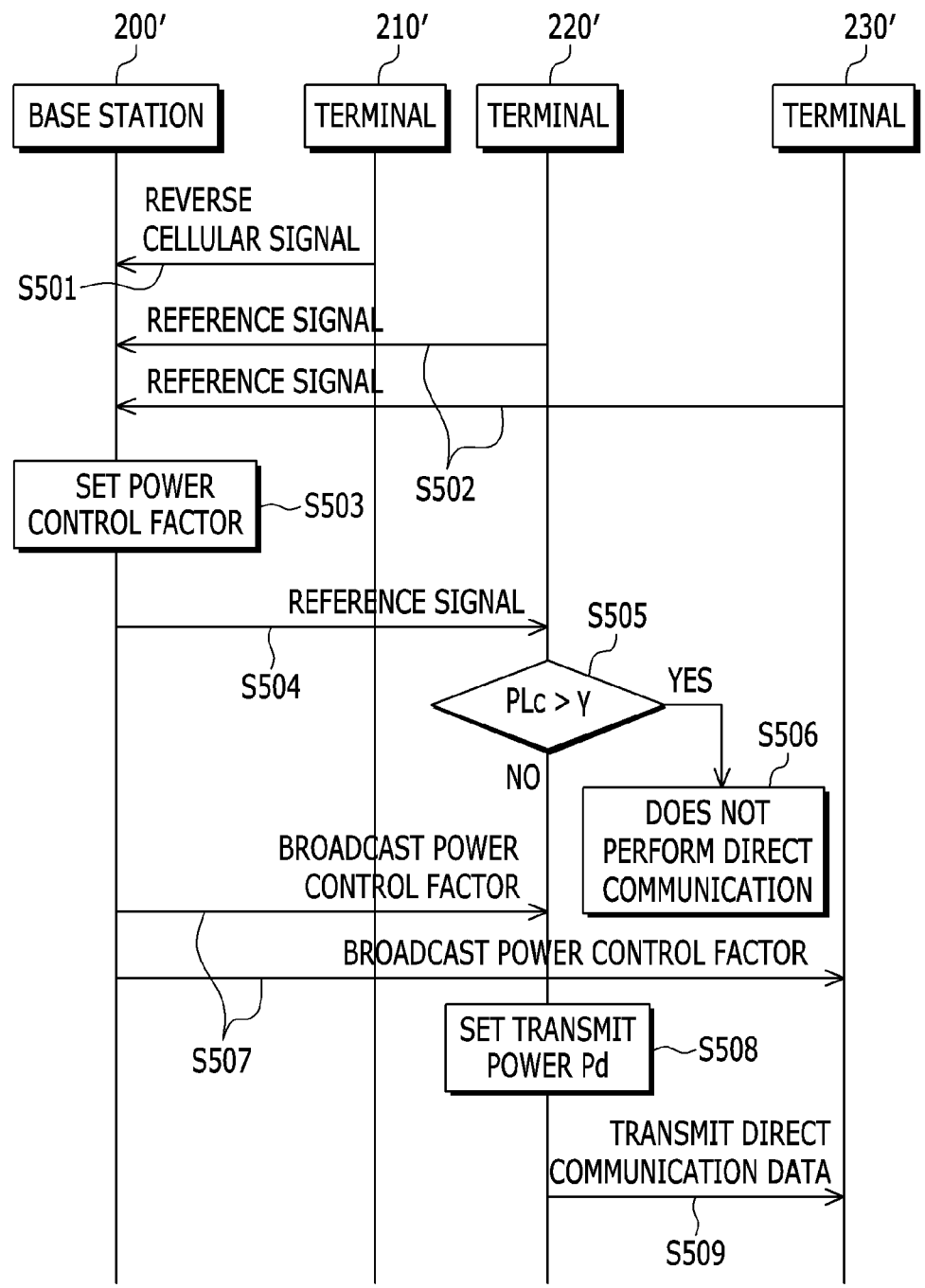
FIG. 5 is a flowchart showing a power control method according to another exemplary embodiment of the present invention.

FIG. 5 is a flowchart showing a power control method according to another exemplary embodiment of the present invention.

First, the base station 200' receives the reverse (uplink) cellular signal from the terminal 210' performing the cellular communication (S501). In addition, the base station 200' receives the reference signal from the terminals 220' and 230' performing the direct communication (S502).

The base station 200' measures the received reverse cellular signal and reference signal, and sets the power control factors $\epsilon_c^{(d)}$ and $\epsilon_d^{(d)}$ using the measured result (S503). That is, the base station 200' sets the power control factor $\epsilon_c^{(d)}$ using the reverse cellular signal which is received from the terminal 210'. In addition, the base station 200' measures an interference amount between the D2D terminals using the reference signal which is received from the terminals 220' and 230', and sets the power control factor $\epsilon_d^{(d)}$ using the measured interference amount.

As shown in FIG. 5, the base station 200' does not set the power control factor by directly measuring the signal, but the base station 200' may set the power control factor after directly receiving associated information messages from the terminal 210' and the terminals 220' and 230'. That is, the base station 200' may receive information on amplitude of the reverse cellular signal in the message form from the terminal 210' performing the cellular communication, and may then set the power control factor $\epsilon_c^{(d)}$ using the information. In addition, the base station 200' may receive information on an interference amount between D2D communications in the message form from the terminals 220' and 230' performing the direct communication, and may then set the power control factor $\epsilon_d^{(d)}$ using the information.

The terminal 220' receive a forward reference signal from the base station 200' (S504), and measures the received reference signal to thereby calculate the path loss gain (PLc). The terminal 220' determines whether or not the calculated path loss gain (PLc) is larger than the predetermined threshold value ($\gamma$)(S505). If the calculated path loss gain (PLc) is larger than the predetermined threshold value ($\gamma$), then the terminal 220' does not perform the direct communication (S506). In addition, if the calculated path loss gain (PLc) is less than or equal to the predetermined threshold value ($\gamma$), then the terminal 220' sets the transmit power in order to perform the direct communication (S505, S508). Although not shown in FIG. 5, the base station 200' may set the predetermined threshold value ($\gamma$) using the reverse cellular signal and may then transmit the set threshold value ($\gamma$) to the terminal 220'.

The base station 200' transmits the power control factors $\epsilon_c^{(d)}$ and $\epsilon_d^{(d)}$ which are set in S503 in a physical layer broadcasting information form or a higher layer broadcasting information form (S507).

The terminal 220' sets the transmit power for the direct communication (d) (d) using the power control factors $\epsilon_c^{(d)}$ and $\epsilon_d^{(d)}$ which are received from the base station 200' (S508). That is, the terminal 220' sets the transmit power Pd for the direct communication by applying the power control factors $\epsilon_c^{(d)}$ and $\epsilon_d^{(d)}$ to Equation 3.

In addition, the terminal 220' transmits the direct communication data to the terminal 230' based on the transmit power which is set in S508 (S509).

Figure 6:
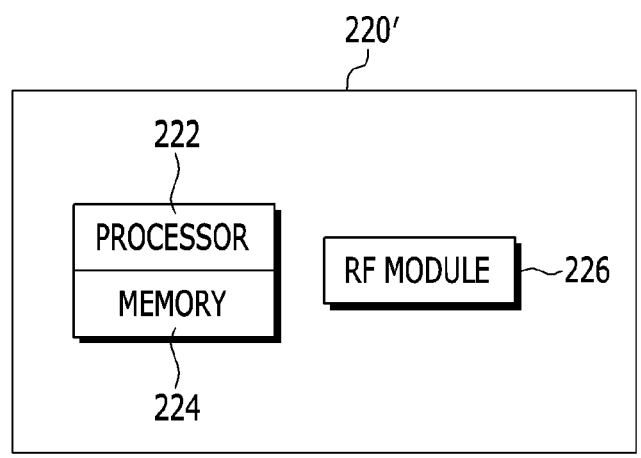
FIG. 6 is a drawing showing the terminal 220' according to an exemplary embodiment of the present invention.

FIG. 6 is a drawing showing the terminal 220' according to an exemplary embodiment of the present invention.

As shown in FIG. 6, the terminal 220' according to the exemplary embodiment of the present invention includes a processor 222, a memory 224, and a radio frequency (RF) module 226.

The processor 222 may be configured to implement the procedures and methods which are described with reference to FIG. 5. In addition, the processor 222 may include the power setting module 221 which is described with reference to FIG. 4, and may perform the operation of the power setting module 221 which is described with reference to FIG. 4.

The memory 224 is connected to the processor 222 and stores various pieces of information which are associated with operations of the processor 222.

The RF module 226 is connected to the processor 222 and transmits or receives the radio signal. The RF module 226 transmits the reference signal which is received from the base station 200' and the reference signal which is received from the counterpart terminal 230' to the power setting module 221 of the processor 222. In addition, the RF module 226 transmits the power control factors which are received from the base station 200' to the power setting module 221 of the processor 222.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of setting transmit power by a first terminal performing direct communication with a counterpart terminal, the method comprising:
   measuring a first channel gain which is a path loss gain between a base station to which the first terminal belongs and the first terminal;
   comparing the first channel gain with a predetermined threshold value;
   setting a first power value for the direct communication in the case in which the first channel gain is less than or equal to the threshold value; and
   performing the direct communication at the first power value.

2. The method of claim 1, further comprising not performing the direct communication in the case in which the first channel gain is larger than the threshold value.

3. The method of claim 1, wherein the setting of the first power value includes setting the first power value by considering a second channel gain which is a path loss gain between the counterpart terminal and the first terminal, and the first channel gain.

4. The method of claim 3, further comprising receiving first and second power control factors from the base station, wherein the first power value is set by a value obtained by multiplying the first channel gain by the first power control factor and a value obtained by multiplying the second channel gain by the second power control factor.

5. The method of claim 4, wherein the base station sets the first power control factor using a reverse cellular signal which is received from a terminal performing cellular communication with the base station, and sets the second power control factor using reference signals which are received from the first terminal and the counterpart terminal.

6. The method of claim 3, wherein the first terminal calculates the second channel gain using a reference signal which is received from the counterpart terminal.

7. The method of claim 1, wherein
   the measuring of the first channel gain includes:
   receiving a reference signal from the base station; and
   measuring the reference signal and calculating the first channel gain.

8. The method of claim 1, wherein a resource for the direct communication is overlapped with a resource which is used for cellular communication performed by the base station.

9. A terminal comprising:
   a radio frequency (RF) module receiving a reference signal from a base station; and
   a processor measuring a first channel gain which is a path loss gain with the base station using the reference signal and controlling direct communication with a counterpart terminal,
   wherein the processor includes a power setting module comparing the first channel gain with a predetermined threshold value and setting a first power value for the direct communication in the case in which the first channel gain is less than or equal to the threshold value.

10. The terminal of claim 9, wherein the power setting module sets a power value so as to not perform the direct communication in the case in which the first channel gain is larger than the threshold value.

11. The terminal of claim 9, wherein the power setting module sets the first power value by considering a second channel gain which is a path loss gain between the counterpart terminal and the terminal, and the first channel gain.

12. The terminal of claim 11, wherein the RF module receives first and second power control factors from the base station, and the power setting module sets the first power value so as to correspond to a value obtained by multiplying the first channel gain by the first power control factor and a value obtained by multiplying the second channel gain by the second power control factor.

13. The terminal of claim 12, wherein the base station sets the first power control factor using a reverse cellular signal which is received from a terminal performing cellular communication with the base station, and sets the second power control factor using reference signals which are received from the terminal and the counterpart terminal.

14. The terminal of claim 9, wherein a resource for the direct communication is overlapped with a resource which is used for cellular communication performed by the base station.

* * * * *